Oct. 10, 1939.                L. E. FLORY                2,175,888
                          PHOTOELECTRIC CATHODE
                          Filed Dec. 31, 1936
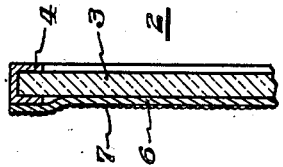
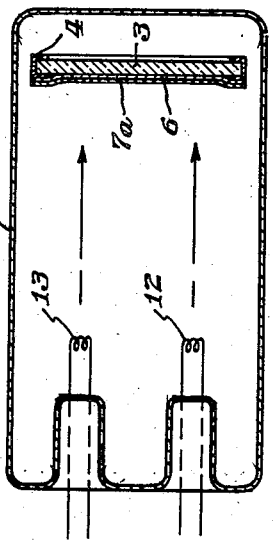
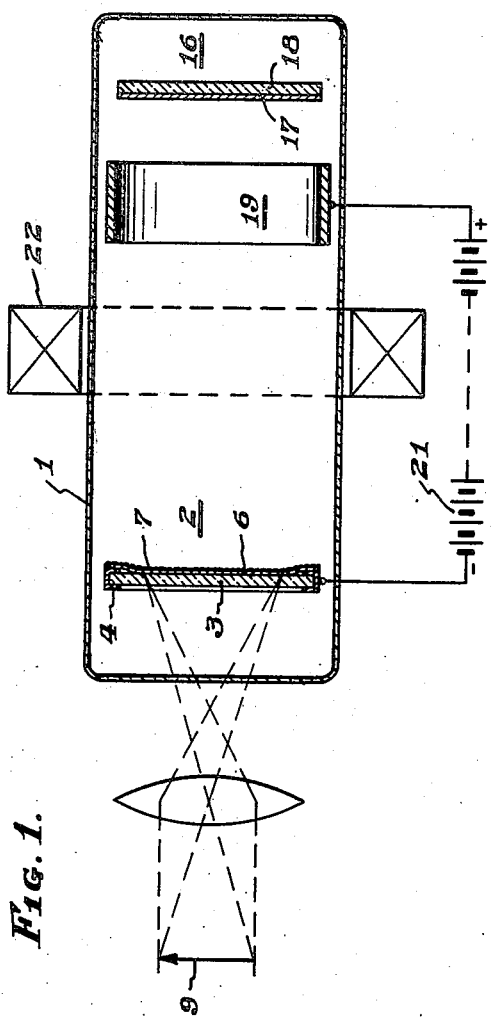
Inventor
Leslie E. Flory
By
Attorney Patented Oct. 10, 1939

2,175,888

UNITED STATES PATENT OFFICE 2,175,888

PHOTOELECTRIC CATHODE

Leslie E. Flory, Oaklyn, N. J., assignor to Radio Corporation of America, a corporation of Delaware Application December 31, 1936, Serial No. 118,433

6 Claims. (Cl. 250—27.5)

My invention relates to photo-electric cathodes and particularly to cathodes which are transparent or semi-transparent to light.

In certain electronic devices it may be desirable to have a transparent photo-electric cathode whereby a light image may be projected upon one side of the cathode to release photoelectrons from the opposite side. For example, such a cathode would be useful in the electronic tube described in application Serial No. 4,024, filed January 30, 1935, by George A. Morton and Arthur W. Vance and assigned to the Radio Corporation of America.

It is, accordingly, an object of my invention to provide an improved photo-electric cathode of the above mentioned type.

A further object of my invention is to provide an improved method of making a photo-electric cathode of the above mentioned type.

In accordance with a preferred embodiment of my invention, a transparent layer of metal such as nickel is formed upon a sheet of glass or mica. Next, a thin layer of silver is formed upon the nickel, this silver layer not having very good light transmitting properties. In order that light may pass through the glass or mica support and through the nickel layer to reach the front surface of the silver, the silver layer is heated to cause it to break up into minute droplets or globules. Light will then pass between the droplets and be diffused, diffracted, and reflected whereby it will reach the side and front surfaces of the droplets. The silver droplets are made photo-sensitive in the usual way by oxidizing the silver and then admitting caesium.

The invention will be better understood by referring to the following description taken in connection with the accompanying drawing in which:

Figure 1 is a view showing one embodiment of my invention,

Figure 2 is a fragmentary view showing the structure of my improved cathode, and Figure 3 is a view which is referred to in explaining the method of making my improved cathode.

Referring to Fig. 1, I have shown a simple form of image intensifier tube 1 having therein a cathode 2 constructed in accordance with my invention. The cathode 2, which is shown more clearly in Fig. 2, comprises a transparent sheet 3 such as glass or mica which has been metallized around the edges as shown at 4 to provide contact with the cathode surface. A thin layer of metal 6 is applied to one side of the transparent sheet 3, preferably by evaporating or sputtering. This metal should be one which is not easily oxidized, such as platinum, aluminum, nickel or chromium.

The metal film 6 is applied to the transparent sheet 3 in order to provide the desired conductivity and it should be as transparent as is consistent with good conductance. Over the surface of the film 6 there is a layer 7 of photo-sensitive globules of silver or the like. In making the cathode 2, after the film 6 has been formed, there is applied a layer of silver 7a, as shown in Fig. 3, the silver being applied preferably by sputtering or evaporation. The layer of silver 7a will be only slightly transparent. In fact, in some cases it may be desirable to apply a layer of such thickness that it is opaque.

In order that light from the image indicated at 9 in Fig. 1 may pass through the transparent plate 3 and through the transparent metal layer 6 to the outside or front surface of the silver, the silver layer 7a is heated sufficiently to cause it to break up into minute droplets. These droplets are microscopic in size and are separated by exceedingly small distances whereby light passing through the cathode from the back side as indicated in Fig. 1 is diffused, diffracted and reflected as it passes between the droplets whereby it reaches their side and front surfaces. As will be pointed out later, these side and front surfaces of the droplets are made photo-sensitive.

Except for the step of making the cathode 2 photo-sensitive, it may be constructed in a container or envelope separate from that in which it is to be used. For example, referring to Fig. 3, the transparent sheet 3 with metallized edge 4 is supported inside an evacuated envelope 11. Inside the envelope there are two filaments 12 and 13 carrying nickel and silver, respectively. In making the cathode, the filament 12 is first heated to evaporate nickel which is deposited upon the mica or glass sheet 3 to form the desired transparent film 6 having good conductivity. Next, the filament 13 is heated to evaporate a layer of silver 7a of the desired thickness upon the nickel film 6. The entire assembly, including the container 11, may be baked in an oven to form the silver globules. If preferred, the cathode structure may be removed from the container and heated to break up the silver 7a into the globules or this step in the process may be done after the cathode has been placed inside the tube 1 in which it is to be used.

In any case, after the silver globules have been formed and the cathode 2 mounted in the tube 1, the tube is evacuated and oxygen is admitted. The silver globules are then oxidized as by means of a glow discharge, preferably established by means of a high frequency generator, as described in United States Patent No. 2,020,305, to S. F. Essig, and assigned to the Radio Corporation of America. The oxygen is then pumped out of the tube 1 and the globules are made photo-sensitive in any suitable manner. Preferably, this is accomplished by admitting caesium or other alkali metal into the envelope 1 from a side tube (not shown) which is later sealed off. A short bake at approximately 200° C. then completes the sensitization of the cathode.

In the particular tube illustrated in Fig. 1, the cathode 2 is employed for the purpose of increasing the intensity of an optical image or for making an object visible as by the use of infra-red rays where otherwise it would be invisible. The tube 1 includes, in addition to the cathode 2, a fluorescent screen 16 which may be of conventional construction consisting of fluorescent material 17 supported upon a glass plate 18. An anode 19 in the form of a metallic ring is provided between the cathode 2 and the fluorescent screen 16 and is maintained at a high positive potential with respect to the cathode 2 by means of a suitable voltage source, such as a battery 21.

It will be understood that the number of electrons leaving a given point on the cathode 2 depends upon the intensity of the light image at that particular point. Therefore, if the electrons leaving the various points in the cathode are caused to travel parallel to each other they will form a light image on the fluorescent screen 16 which represents the object 9. One satisfactory way of causing the electrons to travel from the cathode in parallel paths is to provide a magnetic focusing coil, indicated at 22.

From the foregoing description it will be seen that I have provided a cathode which has good conductivity because of the metallic layer upon which the silver is formed and which, at the same time, is reasonably transparent or translucent because of the spaces between the microscopic globules.

I claim as my invention:

1. A photo-electric cathode comprising a light-transmitting supporting surface, a light-transmitting metallic film on one side of said surface, and a layer of minute photo-sensitive globules on said film.

2. The invention according to claim 1 characterized in that said globules are separated by spaces so small that light passing through said film toward said globules is diffused and diffracted.

3. A photo-electric cathode comprising a transparent supporting surface, a transparent metallic film on one side of said surface, and a multitude of minute photo-sensitive silver globules on said metallic film.

4. The method of making a photo-electric cathode which comprises forming a light-transmitting metallic film upon a light-transmitting supporting surface, said metallic film having the characteristic that it does not break up into droplets when heated to a predetermined temperature, forming a second metallic film upon said first film, said second film having the characteristic that it breaks up into minute droplets when heated to said predetermined temperature, heating said films to said certain temperature and then photo-sensitizing the resulting droplets.

5. The method of making a photo-electric cathode which comprises forming a light-transmitting metallic film upon a transparent supporting surface, forming a silver film upon said metallic film, said metallic film having the characteristic that when heated it breaks up into globules less readily than does said silver film, next heating said silver film sufficiently to make it break up into minute droplets, and then photo-sensitizing said droplets.

6. The method of making a photo-electric cathode which comprises forming a thin light-transmitting metallic film upon a light-transmitting supporting surface, said metallic film having the characteristic that it does not break up into discrete elements when heated to a certain temperature, forming a film of silver upon said first film, said silver film having the characteristic that it breaks up into minute discrete elements when heated to said certain temperature, heating said silver film to said certain temperature whereby discrete silver elements are formed, oxidizing said discrete elements and then combining said elements with caesium to form a photo-electric surface.

LESLIE E. FLORY.